March 11, 1930. W. H. RAGSDALE 1,750,356
PISTON AND RINGS
Filed April 23, 1928
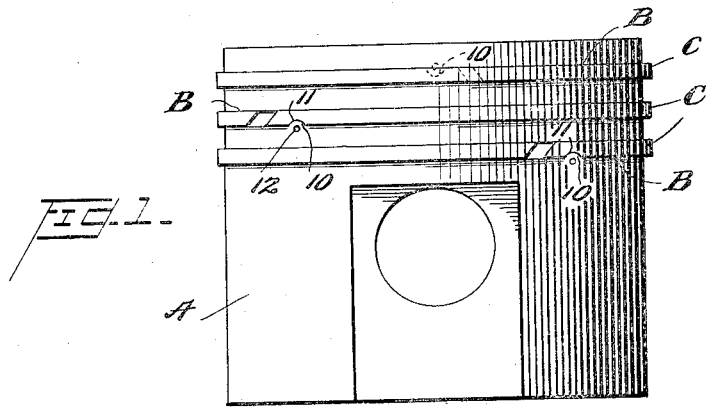
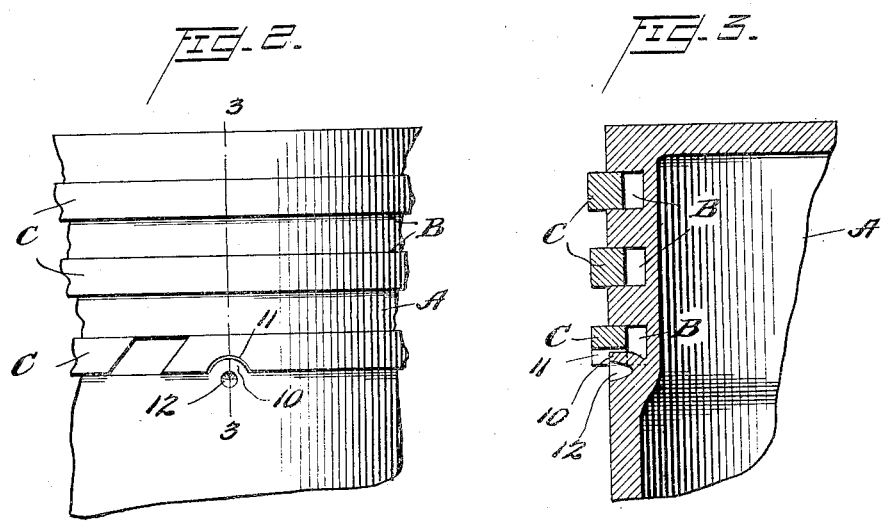
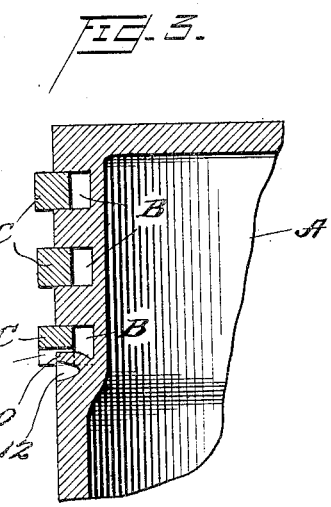
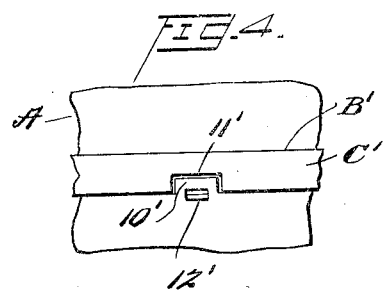
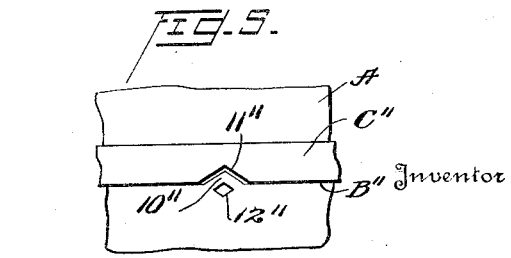
William H. Ragsdale,
Inventor Patented Mar. 11, 1930

1,750,356

UNITED STATES PATENT OFFICE

WILLIAM H. RAGSDALE, OF SILVER SPRING, MARYLAND

PISTON AND RINGS

Application filed April 23, 1928. Serial No. 272,050.

In the internal combustion engine and allied arts employing pistons and expansible packing rings seated in grooves in said pistons, it is well understood that the packing rings must accurately contact with the cylinder walls at all times in order that the greatest efficiency of the engine may be obtained. In internal combustion engines any lack of a complete and accurate contact of the rings with the cylinder wall inevitably results in a weakening of the compression, in the passage of the oil into the combustion chamber and in the fouling of the plugs, as well as carbonization of the valves and the passage of hot gases down along the cylinder walls and the heating of the water in the water jacket so that the engine becomes overheated. It is also well understood that while originally there is usually an accurate fit of the rings, pistons and cylinder walls with relation to each other, yet this originally accurate fit is in no sense permanent, since scoring of the cylinder walls is of frequent occurrence and the cylinders, due to the angular throw of the connecting rods, become somewhat elliptical in cross section while the rings, due to their ability to creep circumferentially of the piston wear equally around their circumferences and retain their circular shape. The efficiency of the engine is greatly impaired whenever the rings are circular and the cylinder wall out of round. It is a matter of common knowledge that this is of frequent occurrence and that when the cylinder wall is scored or is out of round, it is necessary to disassemble the engine and fit new rings and pistons to the cylinders, the operation also involving the elimination of the scores in the cylinder walls and restoration of said walls to a truly round condition.

To overcome this disadvantage, it has been proposed to fasten the rings against circumferential creeping in the grooves in the pistons. The means to secure this fastening of the rings against their creeping action in the piston grooves have contemplated the use of pins, or the like, riveted, screwed or otherwise fastened to the rings or to the piston, and projecting therefrom into openings formed in the one case in the piston and in the other case in the rings. These proposals have been found to be open to objections of such serious nature that their adoption has been restricted to within substantially negligible limits. Among the objections which have been noted have been complications in the construction of the rings resulting in a considerable increase in the first cost thereof; the difficulties experienced in installing pinned rings in engines not originally constructed for the use of such rings; and the tendency of the pins themselves to become loosened in use and to score the cylinder walls.

The ultimate purpose of the instant invention, therefore, is to provide a means for preventing circumferential creeping of an expansible packing ring within the groove in the piston head provided to receive said ring and which means will not be open to any of the objections which have been urged against the adoption of the pinned rings hitherto proposed. In pursuance of this purpose, my invention contemplates a relative construction of ring and piston characterized, severally, in that (1) it will effectually prevent creeping of the packing rings circumferentially of the pistons without creating any danger that the means provided to prevent such creeping will themselves, at any time or under any condition of use, be liable to score the cylinder walls; (2) its provision will entail no additional cost in the production of the piston or its ring, or at the most will entail an additional cost which is substantially negligible; and (3) its nature is such that it may be applied to old as well as to new engines and rings by an ordinary mechanic without special tools or the exercise of special skill.

The invention comprises a piston, or the like, hereinafter called piston, having a groove, and a ring seated in said groove, the groove and piston having abutting edges relatively formed, the one with an integral projection and the other with a notch to receive said projection: the notch and projection cooperating to hold the ring against any creeping motion circumferentially of the piston while permitting expansion and contraction of the ring incident to its close contact with the cylinder wall at all points. In the accompanying drawings, I have illustrated certain substantially similar but specifically different embodiments of the invention. These are typical embodiments and should be so regarded, since I realize that the principle of the invention may be embodied in structures in which the interengaging projections and notches may be of different shapes from any of those illustrated.

In said drawings:—

Fig. 1 is a side view of a piston having three ring grooves and three piston rings held against creeping motion in the grooves by means within the spirit of the present invention and shows the relationship to each other of the means which severally hold the rings in the grooves:

Fig. 2 is a detail on a larger scale than Fig. 1 to more clearly show the shape of the interengaging projection and notch of the specific form shown in Fig. 1:

Fig. 3 is a section on the line 3—3 of Fig. 2:

Figs. 4 and 5 are detail views showing other shapes of projections and notches in lieu of that shown in Figs. 1, 2 and 3.

A, in all the figures of the drawings, designates the piston: B, in Figs. 1, 2 and 3, and B' in Fig. 4 and B'' in Fig. 5 designate the ring grooves which extend circumferentially around the piston: and C, in Figs. 1, 2 and 3, C' in Fig. 4 and C'' in Fig. 5, designate the piston rings. It will be noticed upon reference to each figure of the drawing that an edge of each ring groove is formed with a projection, marked 10 in Figs. 1, 2 and 3, 10' in Fig. 4 and 10'' in Fig. 5: and that an edge of each ring is formed with a notch whose shape corresponds to that of the particular projection 10, 10' or 10'' with which it is to co-operate. The notches are marked 11 in Figs. 1, 2 and 3, 11' in Fig. 4 and 11'' in Fig. 5.

The projections are integral with those edges of the grooves which, when the piston and its rings are assembled, abut against the notched edges of the rings and the projections and notches are so correlated that the notches receive the projections and co-operate therewith in preventing any creeping movement of the rings circumferentially about the piston. With the exception of the referred to notches, the rings may be, and as here shown are, of the ordinary one-piece construction. They are slitted as usual and the projections are so arranged that the slit portions of the rings are in an offset relation, as shown in Fig. 1.

The only difference between the constructions shown in Fig. 4 and Fig. 5 and the constructions shown in Figs. 1-3 is in the form of the projection and notch. In the constructions shown in Figs. 1-3, the projection (10) is of substantially semi-circular shape and the notch (11) is of corresponding shape. In the form shown in Fig. 4, the projection (10') has a flat upper surface and the notch (11') to receive said projection, is of corresponding shape. In the form shown in Fig. 5, the projection (10'') has slanted sides converging to a point, and the notch (11'') is of corresponding shape.

Whatever be the form of the projections, they are preferably formed as an integral part of the piston and the notches hence are formed in the rings: and it is essential, according to the instant invention, that the projection and notches, respectively, be formed in the abutting edges of the piston groove and ring and that the projections be integral with the part to which it is formed: as contradistinguished from a pin, screw, or other like element secured to the part by which it is carried. By thus making the projection integral with the part which carries it, there is no danger whatever that it may become loosened in time and act to score the cylinder wall. Thus, one of the purposes of this invention, which is as already stated, to provide a means for preventing the creeping of the ring circumferentially of the piston without creating a liability of the scoring of the wall of the cylinder in contact with which the piston and its ring operate, is attained. It will also be particularly noticed that the means for preventing the creeping of the ring is of such nature that it does not increase but rather tends to reduce the time required in assembling the rings and pistons, since the notches in the rings extend through the latter from side to side and it is necessary only to register the notches with the corresponding projections and then allow the ring to spring into its place within the groove, and since also the relative positions of the projections with relation to the several grooves will act as a guide in the setting of the rings in those positions in the grooves wherein their slits will be in offset relation and will maintain the rings in said relation while being assembled with the piston and at all times during the operation of the piston with the rings. In short, the means of holding the rings against creeping motion within the grooves does not increase the difficulties of assembling the rings and pistons or create any liability of the ring holding members to score the cylinder walls. It thereby overcomes objections which have been urged against the pinned rings, so called, hitherto proposed.

It additionally is of a nature such that it may be applied without substantial cost to new pistons and also to pistons which have been used. The projections here shown may be formed by a center or other appropriate punch, with the use of which all mechanics are very familiar. In the construction shown in Figs. 1-3, the projection 10 is formed by a center punch, the punch mark being indicated at 12. It will be understood, accordingly, that the mechanic forms the projections with the use of a center punch merely by punching the side of the piston at the place appropriate to the edge of the ring groove, this punching of the piston producing the projection 10. The projection 10' is similarly formed by an oblong punch, the mark or recess left thereby being designated 12' and the projection 10'' is formed by a diamond-shaped punch, the punch mark being designated 12''. The punches, whatever their shape, cause a corresponding outward bulging of the metal at the edge of the groove to thereby form the projections referred to. This way of producing the projections is particularly, although not exclusively, applicable to aluminum pistons.

Having thus set forth preferred embodiments of my invention what I believe to be new and desire to secure by Letters Patent of the United States, is:—

1. A piston having a ring groove and including a punch mark in such relation to an edge of the groove as to cause the portion of said edge at a place adjacent said mark to protrude outward into the groove to form an integral projection by which an expansible piston ring seated in the groove and having a notch in its edge may be anchored against movement circumferentially of the piston.

2. That improvement in the art of preventing creeping of an expansible packing ring circumferentially of a piston having a groove to receive said ring, which comprises the punching of the body of the piston at a place adjacent an edge of the groove to thereby expand into the groove a part of the metal forming an edge of the groove.

3. That improvement in the art of preventing creeping of an expansible packing ring circumferentially of a piston having a groove in which the ring is seated, which consists in punching the body of the piston at a place adjacent an edge of its groove to thereby form a bulge in said edge, and the provision of the corresponding edge of the ring with a notch to receive the thus bulged out edge of the groove.

In testimony whereof I affix my signature.

WILLIAM H. RAGSDALE.